C. A. DUNHAM.
THERMOSTATIC CONTROLLER.
APPLICATION FILED APR. 8, 1907.

907,478.

Patented Dec. 22, 1908.

3 SHEETS—SHEET 1.

WITNESSES

INVENTOR
Clayton A. Dunham
BY
ATTORNEYS

C. A. DUNHAM.
THERMOSTATIC CONTROLLER.
APPLICATION FILED APR. 8, 1907.

907,478.

Patented Dec. 22, 1908.

3 SHEETS—SHEET 2.

WITNESSES

INVENTOR
Clayton A. Dunham
BY Munn & Co
ATTORNEYS

C. A. DUNHAM.
THERMOSTATIC CONTROLLER.
APPLICATION FILED APR. 8, 1907.

907,478.

Patented Dec. 22, 1908.

3 SHEETS—SHEET 3.

WITNESSES

INVENTOR
Clayton A. Dunham,
BY Munn & Co
ATTORNEYS

UNITED STATES PATENT OFFICE.

CLAYTON AUBRA DUNHAM, OF MARSHALLTOWN, IOWA.

THERMOSTATIC CONTROLLER.

No. 907,478.

Specification of Letters Patent.

Patented Dec. 22, 1908.

Application filed April 8, 1907. Serial No. 367,051.

*To all whom it may concern:*

Be it known that I, CLAYTON AUBRA DUNHAM, a citizen of the United States, and a resident of Marshalltown, in the county of Marshall and State of Iowa, have invented a new and Improved Thermostatic Controller, of which the following is a full, clear, and exact description.

The invention relates to certain improvements in means for thermostatically controlling the passage of fluids, and more particularly to means whereby a thermostatic device disposed in one conduit or passage may be operated not only by a variation in the temperature of the fluid in that conduit or passage, but also by a variation in the temperature of a fluid flowing in a conduit or passage separate and distinct therefrom.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, and in which—

Figure 1:
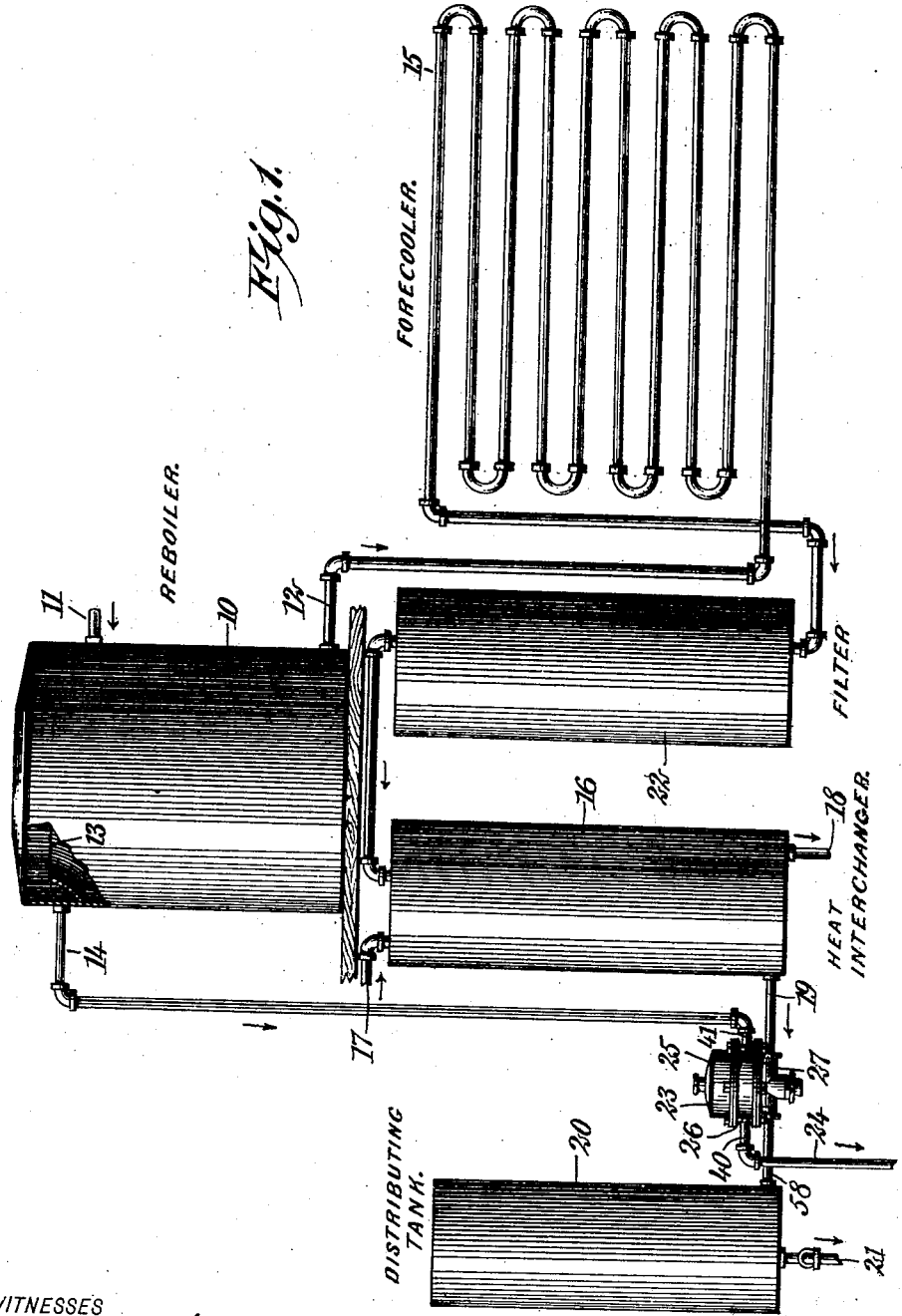
Figure 2:
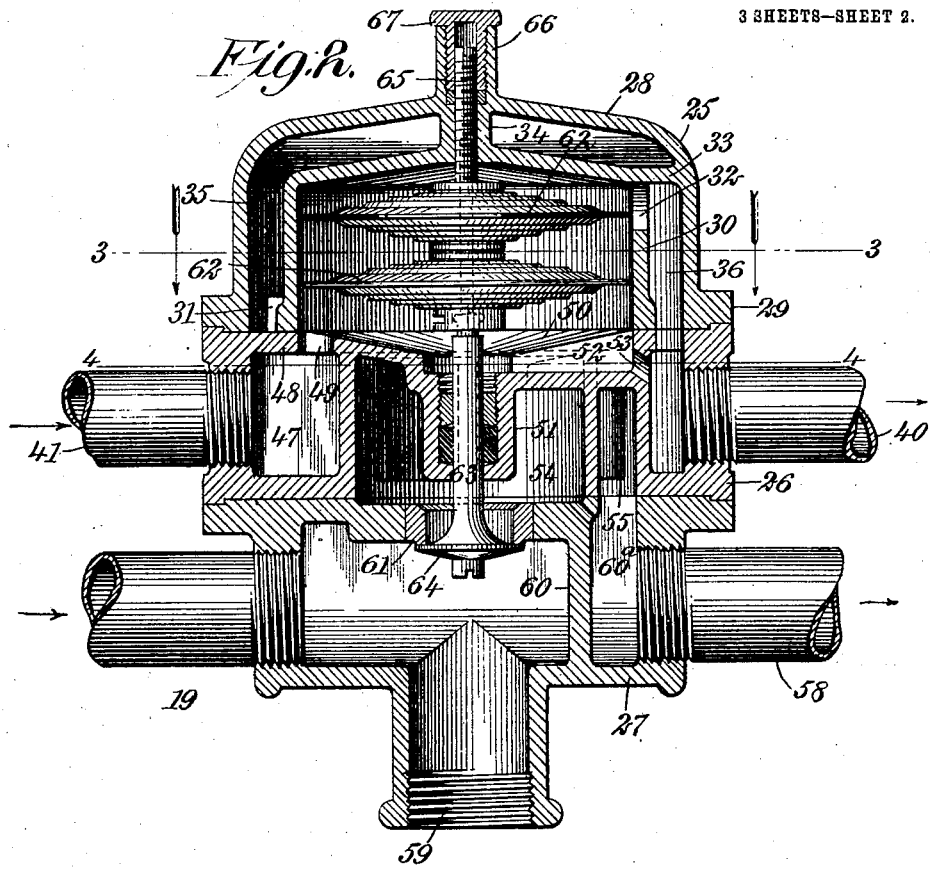
Figure 3:
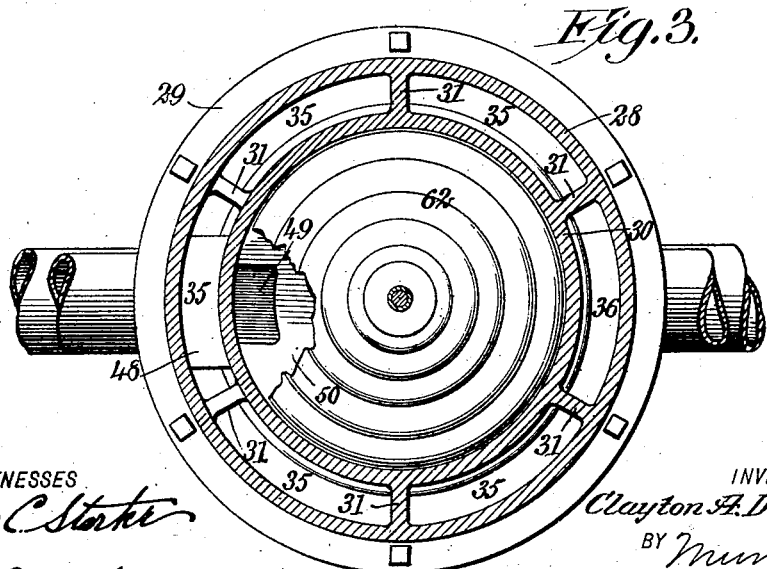
Figure 4:
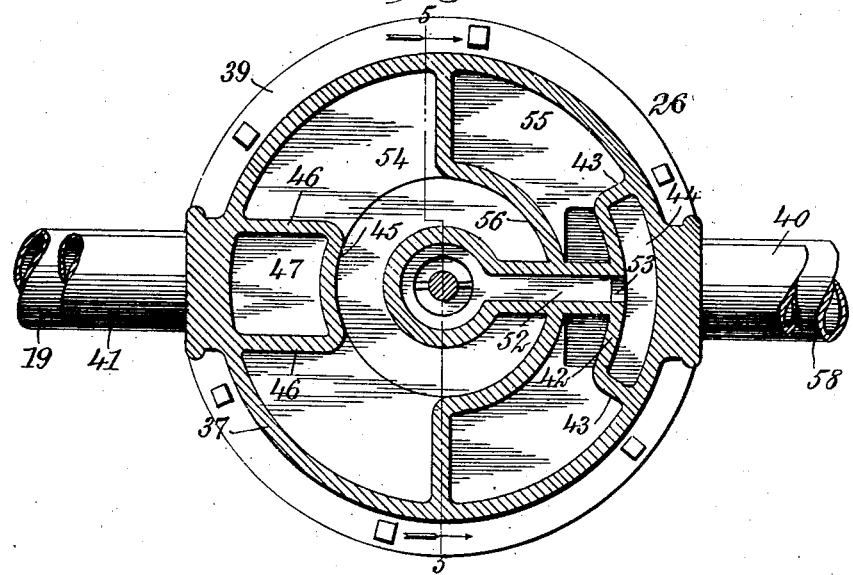
Figure 5:
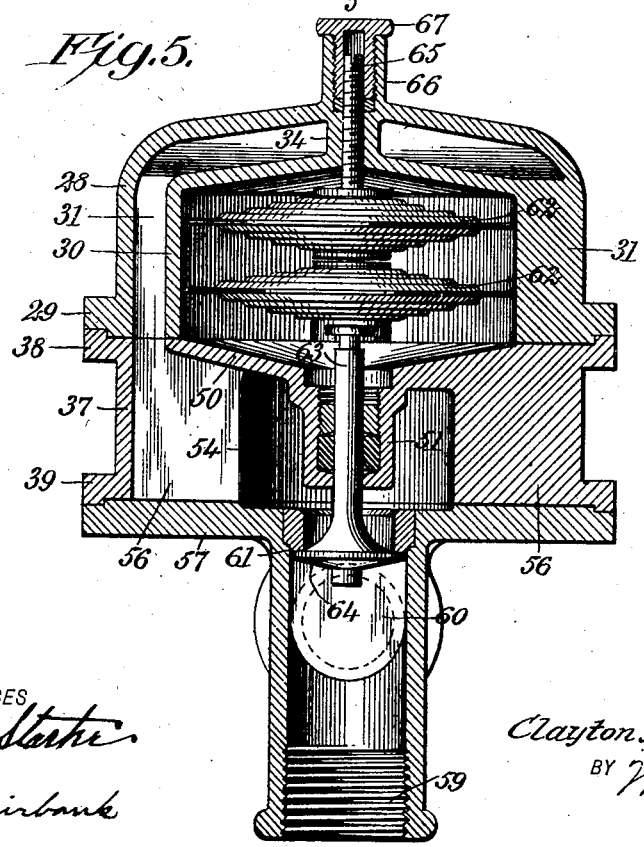

Figure 1 is a diagrammatic illustration of a portion of a water purifying and cooling system employing a thermostatic controller constructed according to my invention; Fig. 2 is a central vertical section through the thermostatic controller employed; Fig. 3 is a transverse section on the line 3—3 of Fig. 2; Fig. 4 is a transverse section on the line 4—4 of Fig. 2; and Fig. 5 is a central vertical section taken in a plane at right angles to the plane of Fig. 2, and on the line 5—5 of Fig. 4.

In order to clearly set forth my invention and the method of operation of the same, I have illustrated it in connection with an ice-making plant in which it is customary to thoroughly purify the water before freezing the same. In order to accomplish this result the water is often converted into steam, and the steam condensed to remove all non-volatile impurities, and this water of condensation is heated to the boiling point in a container known in the art as a "re-boiler"; the object of the last step being to remove oil and other impurities which overflow from the skimmer and flow to waste. The water having been heated in the re-boiler is drawn off and cooled to the temperature of the atmosphere in a fore-cooler and then further cooled by the exhaust ammonia returning to the condenser or to the absorber, as the case may be, before being delivered to the distributing tank or the freezing cans.

In Fig. 1 of the drawings I have illustrated a conventional form of re-boiler 10 having an inlet conduit 11 and a main outlet conduit 12. Within the re-boiler and adjacent the top thereof there is provided a trough 13 constituting the skimmer and communicating with a waste outlet pipe 14. The re-boiler is heated in any suitable manner, and the inlet conduit 11 may be provided with any suitable form of float valve mechanism, whereby the delivery of water to the re-boiler may be automatically controlled. The outlet conduit 12 from the re-boiler leads to a fore-cooler illustrated in the drawing has a coil 15 exposed to the atmosphere, whereby the heated water is materially reduced in temperature. The outlet from the fore-cooler leads to a heat interchanger 16, wherein the water is further cooled by the action of the ammonia flowing through a conduit 17 leading from the expansion coils and delivering through a conduit 18 leading to the compressor or the absorber. From the heat interchanger 16 the water is delivered through a conduit 19 to the freezing cans, or as shown in the drawings, to a distributing tank 20 having an outlet 21. Within the conduit leading from the re-boiler to the distributing tank or freezing cans I may, if desired, insert a suitable filter 22 for additionally purifying the water.

Within the conduit 19 and preferably intermediate the heat interchanger and the distributing tank, I provide my improved thermostatic controller 23 having two independent passages therethrough. One of these passages communicates with the heat interchanger and with the distributing tank and is adapted to be controlled by a suitable thermostatic valve, while the other of said passages communicates with the outlet conduit 14 from the skimmer of the re-boiler and delivers the waste products through a conduit 24 preferably leading to the sewer. It is evident that no special form of re-boiler, fore-cooler or interchanger need be employed, as the operation of my improved system is entirely independent of the structural details of these parts, it only being essential that the main discharge conduit from the re-boiler be opened by the hot impurities and be later automatically closed by the passage of the cooled purified water through said main discharge outlet. The thermostatic controller 23 illustrated in Fig. 1 may be of various different forms of construction, but is preferably constructed as illustrated in Figs. 2 to 5, inclusive. As shown, the thermostatic controller is provided with two separate and independent passages therethrough, one of which passages is controlled by a valve, and the other of which is permanently open. To the valve is connected an expansion disk so located that it may be affected by the passage of liquid through either of the conduits, and thus the valve may be opened by the passage of a liquid of one temperature through one conduit and closed by the passage of a liquid of a different temperature through the other conduit.

As illustrated, the body of the device is formed of three separate sections 25, 26 and 27. The first of these serves as a dome or chamber for the expansion disk; the second is provided with inlet and outlet passages for one of the conduits, and the third is provided with inlet and outlet passages for the other conduit. The upper first mentioned section is formed of an outer dome-shaped wall 28 having an outwardly directed flange 29 adjacent the lower edge thereof, whereby this section may be bolted or otherwise rigidly secured to the adjacent section. Within the dome and lying substantially parallel to the outer wall 28, I provide an inner wall 30 spaced therefrom by a plurality of radially disposed partitions 31 extending from the bottom of the section along the circumferential sides of the dome but not extending across the top portion thereof as illustrated in Fig. 5. This inner wall 30 is provided with a single perforation or opening 32 intermediate two of the radial partitions 31, and the inner wall 30 is connected to the outer wall 28 at the top of these two partitions by a transverse wall 33. At the center of the top of the dome the inner and outer walls are connected by a cylindrical post 34 having an axial passage therethrough for the adjusting mechanism of the expansion disks. By means of the walls arranged as above described, I form a plurality of separate compartments 35, all of which communicate with the space between the domes at the top, and there is also provided a compartment 36 similar to the compartments 35 but prevented from communicating therewith by means of the transverse wall 33; said compartment 36 being in communication with the interior of the inner dome by means of the perforation 32.

The second or intermediate section 26, a transverse section of which is illustrated in Fig. 4, is formed of an outer cylindrical wall 37 having outwardly extending flanges 38 and 39 adjacent the ends thereof, whereby the section may be rigidly secured to the remaining sections. Extending through one side of the cylindrical wall 37 there is provided a passage into which may be screw-threaded a conduit 40 communicating with the conduit 24 leading to the sewer or a suitable container for the waste products, and the opposite side of the cylindrical wall is provided with a passage into which may be screw-threaded the conduit 41 communicating with the conduit 14 leading from the reboiler. Within this section I provide a plurality of partition walls so constructed that the fluid entering the conduit 41 may flow through the passage 49 of the middle section and into the interior of the dome and escape through the ports 32 and 53 and compartment 36 to the conduit 40 but cannot pass to the compartments 35. Preferably, these partitions include a curved partition 42 lying in alinement with the inner cylindrical wall 30 of the upper section and connected to the upper cylindrical wall by radial walls 43 in alinement with two of the radial partitions 31. This curved wall and the two radial walls form with the outer cylindrical wall 37, a compartment 44 in communication with the pipe 40 and having an open top in communication with the compartment 36 of the upper section. Opposite to the curved wall 42 and concentric therewith I provide a second curved wall 45 lying on the circumference of a smaller circle and, therefore, lying nearer the center of the device than does the wall 30 of the first section. This curved wall 45 is connected to the cylindrical wall by two parallel partitions 46, whereby a compartment 47 is formed which communicates with the inlet conduit 41. The bottom of this compartment is closed and the top is prevented from communicating with the compartment 35 located above by means of a top wall 48, which latter is provided with a perforation or passage 49, whereby communication is established with the interior of the inner dome of the upper section. The remaining portion of the top of this section lying within the cylindrical wall 30 of the upper section is closed by an inverted cone-shaped wall 50, whereby the interior of the dome of the upper section is prevented from communicating with any portion of the intermediate section 26, except the small compartments 44 and 47. The inverted cone-shaped wall 50 is provided with a depending cylindrical projection 51 serving as a packing box for the valve stem, and is also provided with a trough or passage 52 leading to the compartment 44 and communicating therewith by means of an aperture 53 to afford a drainage for any liquid which may collect within the inner dome. The remaining space within the section 26 and lying below the conical wall 50 is subdivided into two compartments 54 and 55 by means of a wall 56, the end portions of which lie along a diameter of the section at right angles to the diameter defined by the inlet and outlet conduits, and the intermediate portion of which lies in the arc of the same circle as does the wall 45. Both of these compartments communicate with corresponding compartments in the lower section, and the compartment 55 communicates with the two compartments 35 of the top section lying on opposite sides of the compartment 36, while the compartment 54 communicates with the other three compartments 35.

The lower or bottom section 27 is formed somewhat similar to a T-joint with a flat upper plate 57 closing the bottom of the intermediate section and adapted to be rigidly secured thereto. One side of the section is provided with a threaded aperture adapted to receive the conduit 19 leading from the heat interchanger, and the opposite side of the section is provided with a threaded aperture adapted to receive the conduit 58 leading to the distributing tank or to the freezing cans. The lower end of the section is provided with an aperture 59 normally closed by a plug and whereby the device may be drained or the valve removed. Direct communication between the conduits 19 and 58 is prevented by means of a transverse partition 60 lying in alinement with or directly connected to the partition 56 of the intermediate section. The top plate 57 of the lower section intermediate this partition and the conduit 19 is provided with a valve seat 61 through which communication between the compartment 54 of the intermediate section and the conduit 19 of the lower section is established. Adjacent the upper end of the partition 60 and directly connecting the compartment 54 to the conduit 58 I may, if desired, provide an aperture 60ª to facilitate the drainage of said compartment.

Located within the inner dome of the top section, I provide one or more thermostatic disks 62, each containing a liquid of high volatility. The lower one of these disks is operatively connected to the valve stem 63 extending through the packing box within the cylindrical projection 51 and supporting the valve 64 upon the under side of the valve seat 61. The upper thermostatic disk is connected to a threaded stem 65 extending up through the hollow cylindrical connecting post 34 and terminating within an upwardly extending interiorly threaded collar 66 carried by the upper section. Within this collar I provide a suitable packing and locking nut 67, whereby the stem 65 may be rigidly secured in place and the escape of liquid from the interior of the dome effectively prevented.

In the operation of my improved system, the re-boiler 10 is filled to the desired extent through the conduit 11 or in any other suitable manner, and is then heated to the boiling point and the impurities contained in the water rise to the top and overflow into the skimmer communicating with the thermostatic controller by means of the conduit 14. The overflow of the impurities indicates that the liquid has been heated to the desired extent and is in condition to be drawn off and conducted to the freezing cans. The device is therefore so constructed that the skimmings escaping through the conduit 14 enter the thermostatic controller through the conduit 41, and pass through the aperture 49 into direct contact with the thermostatic disks. From the interior of the dome they may pass through the apertures 32 and 53 into the compartments 36 and 44 and out through the waste conduit 24. The thermostatic disks are thus heated and the resulting expansion causes the valve 64 to open and permit the passage of the purified water from the main outlet pipe 12 of the re-boiler through the fore-cooler, heat interchanger, &c., to the thermostatic controller by way of the conduit 19. The liquid entering through the conduit 19 flows past the valve into the compartment 54 and thence into the space between the inner and outer domes. The water rising to the top of two of the opposite partitions 31 and flowing across the top of the dome, flows down through the other compartments 35 into the compartment 55 of the intermediate section. From here the water flows directly to the conduit 58 and to the freezing cans or to the distributing tank, as the case may be. The water on its way from the re-boiler to the thermostatic controller has been cooled to a comparatively low temperature by means of the fore-cooler and heat interchanger, and, therefore, in passing through the space between the two domes slowly but eventually serves to cool the thermostatic disks and to close the valve. As the skimmings come in direct contact with the disks, it will be noted that the valve is opened very quickly, but as the cold water does not come in direct contact therewith but only passes through the space between the domes, some little time occurs before the valve is closed, and meanwhile a considerable quantity of water has been drawn off from the re-boiler. The re-boiler is now refilled to the desired extent and the operation is repeated.

It will be noted that only a small quantity of the liquid delivering through the overflow conduit is permitted to escape, as its action upon the expansion disks is almost instantaneous and as soon as the disks have operated to open the valve, the level of the liquid within the re-boiler is lowered and further overflow is stopped. The re-cooling of the expansion disks is then facilitated by the complete drainage of the skimmings through the small port 53 at the end of the trough or channel 52.

Having thus described my invention, I claim as new and desire to secure by Letters Patent:

1. In combination, a conduit, a thermostatic device located in said conduit and operated by variations in the temperature of a fluid therein, and a second conduit separate from said first-mentioned conduit and having a portion thereof substantially encircling said thermostatic device but separate therefrom, whereby the latter is also operated by variations in the temperature of a fluid in the second conduit.

2. In combination, a conduit including a chamber, a thermostatic device located within said chamber and subjected to the thermostatic action of the fluid therein, and a second conduit separate therefrom and having a portion thereof forming a jacket about said chamber, whereby said thermostatic device is also subjected to the thermostatic action of the fluid in said second conduit.

3. A thermostatic controller, comprising a conduit, a plurality of thermostatic disks operatively connected together and acting in multiple and located in said conduit, and a second conduit separate and distinct from the first-mentioned conduit and having a portion thereof adjacent said thermostatic disks, whereby said disks are subjected to variations in the temperature of the fluids in both conduits, but are directly exposed to the fluid of only the first conduit.

4. A thermostatic controller, comprising a casing having two separate passages therethrough, one of said passages having a valve located therein and the other of said passages having a chamber therein, and a thermostatic controller within said chamber and operatively connected to said valve, and the first mentioned passage arranged to substantially surround said chamber.

5. A thermostatic controller, comprising a casing having a chamber therein, said chamber being provided with inlet and outlet passages, a thermostatic device within said chamber, and a valve operatively connected to said thermostatic device, said casing having independent inlet and outlet passages leading to said valve and substantially surrounding said chamber.

6. A thermostatic controller, comprising a casing having a chamber located therein and provided with inlet and outlet passages, and said casing also having a passage therethrough independent of said chamber and substantially surrounding the same, a thermostatic device within said chamber, and a valve within said last mentioned passage and operatively connected to said thermostatic device.

7. In combination, a conduit having a valve located therein, a second conduit, and a thermostatic device exposed to the action of the fluid in one conduit for opening the valve and exposed to the fluid of the other conduit for closing said valve, said thermostatic device comprising a plurality of thermostatic disks operatively connected together.

8. A thermostatic controller, comprising a casing having a double wall or chamber therein, an inlet and an exhaust for said chamber, a plurality of thermostatic disks within said chamber operatively connected together and acting in multiple, a valve operatively connected to said disks, and a separate inlet and outlet for the space within said double wall.

9. A thermostatic controller, comprising a casing having a double-walled chamber therein, an inlet and an outlet for said chamber, a thermostatic device within said chamber, a member adapted to be operated by said device, and a separate inlet and outlet for the space within said double wall, whereby a fluid of a different temperature may flow therethrough.

In testimony whereof I have signed my name to this specification in the presence of two subscribing witnesses.

CLAYTON AUBRA DUNHAM.

Witnesses:
SAMUEL ORMEROD,
RALPH M. McBRIDE.